JOHN A. BAKER
LESTER A. OLSON
CONRAD M. FRITZ
INVENTORS

BY
ATTORNEY

Feb. 16, 1965    J. A. BAKER ETAL    3,169,624
AUTOMATIC COIN-CONTROLLED SOUND RECORDING APPARATUS
Filed June 20, 1960    7 Sheets-Sheet 3
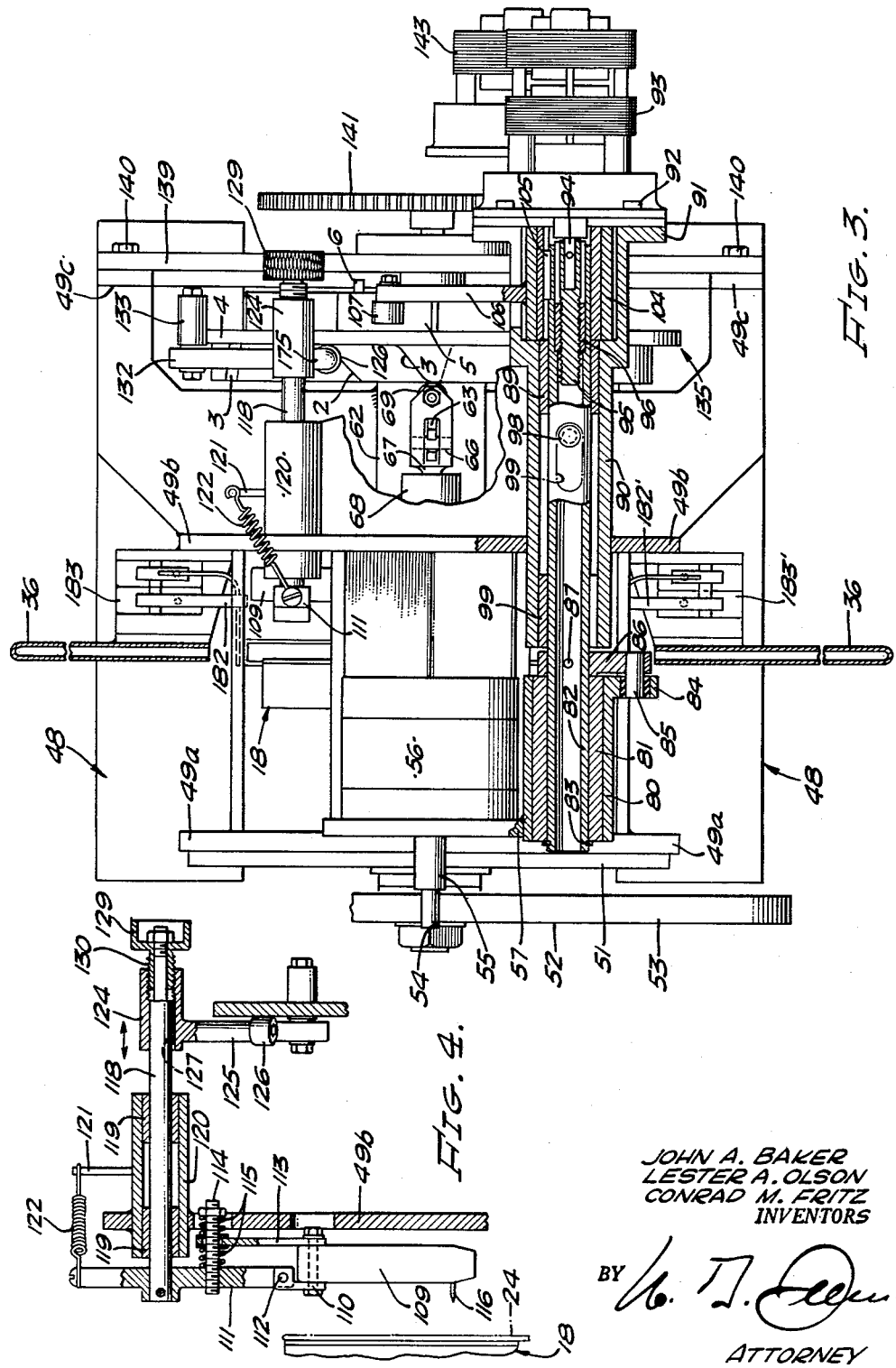
JOHN A. BAKER
LESTER A. OLSON
CONRAD M. FRITZ
INVENTORS
BY
ATTORNEY

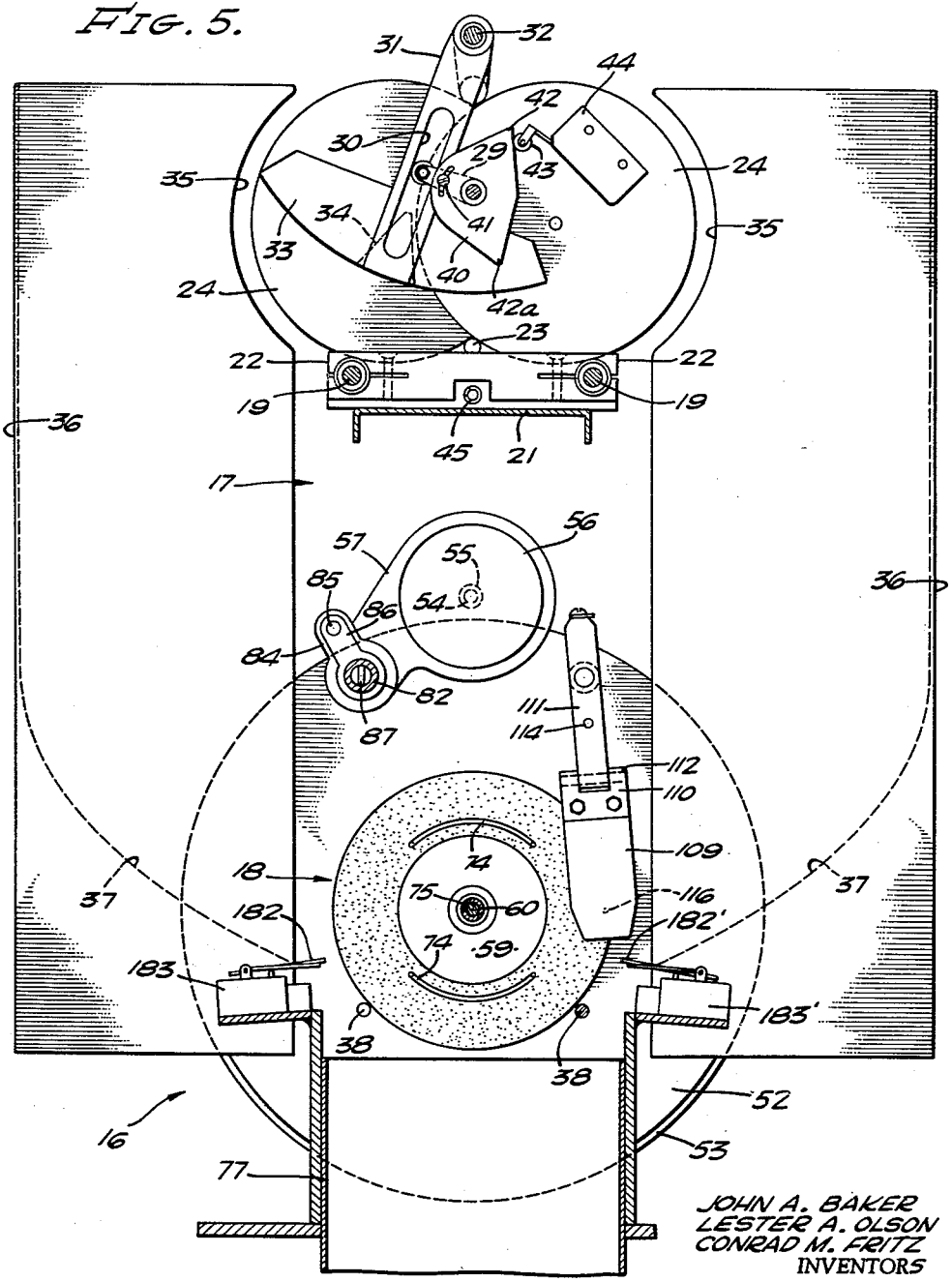

JOHN A. BAKER
LESTER A. OLSON
CONRAD M. FRITZ
INVENTORS

ATTORNEY

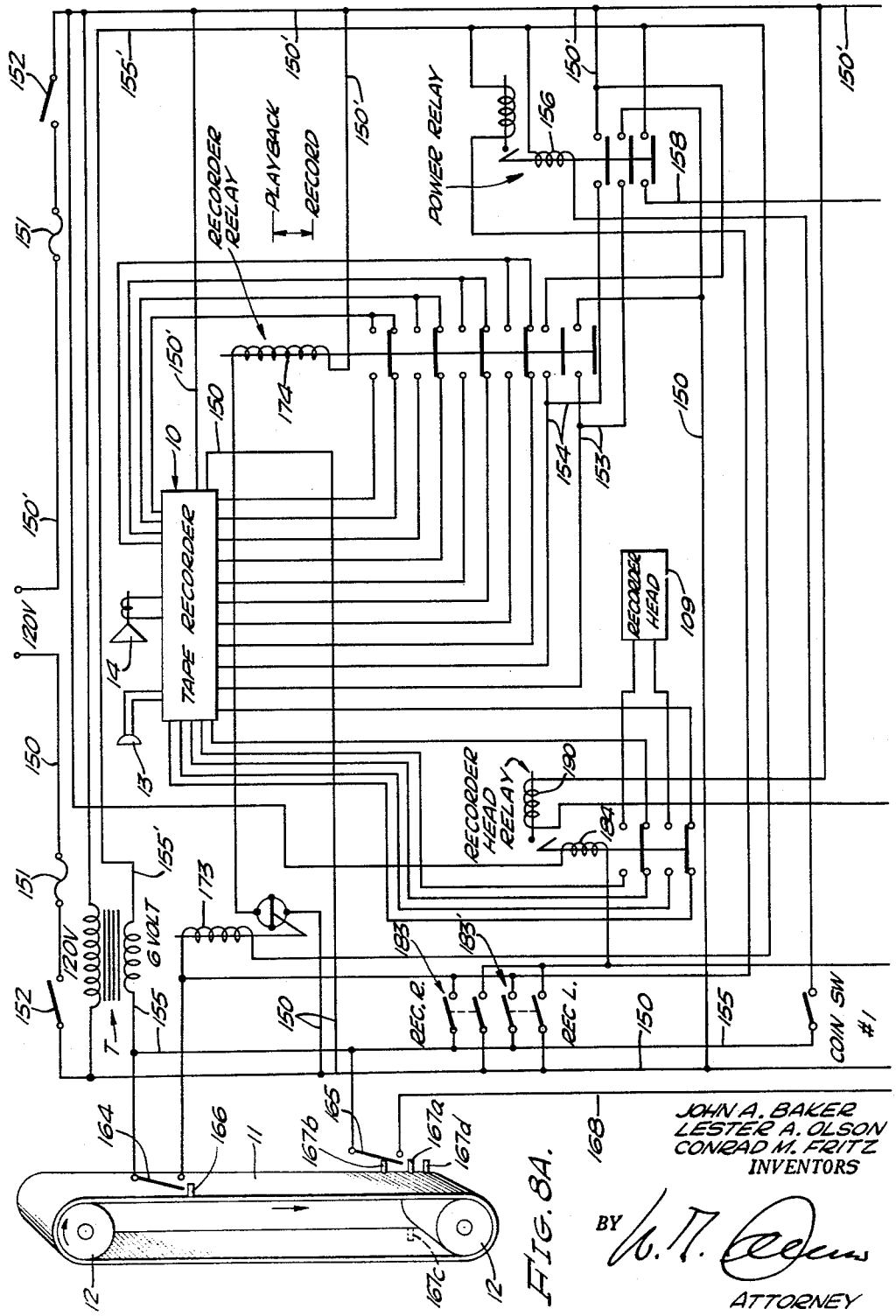

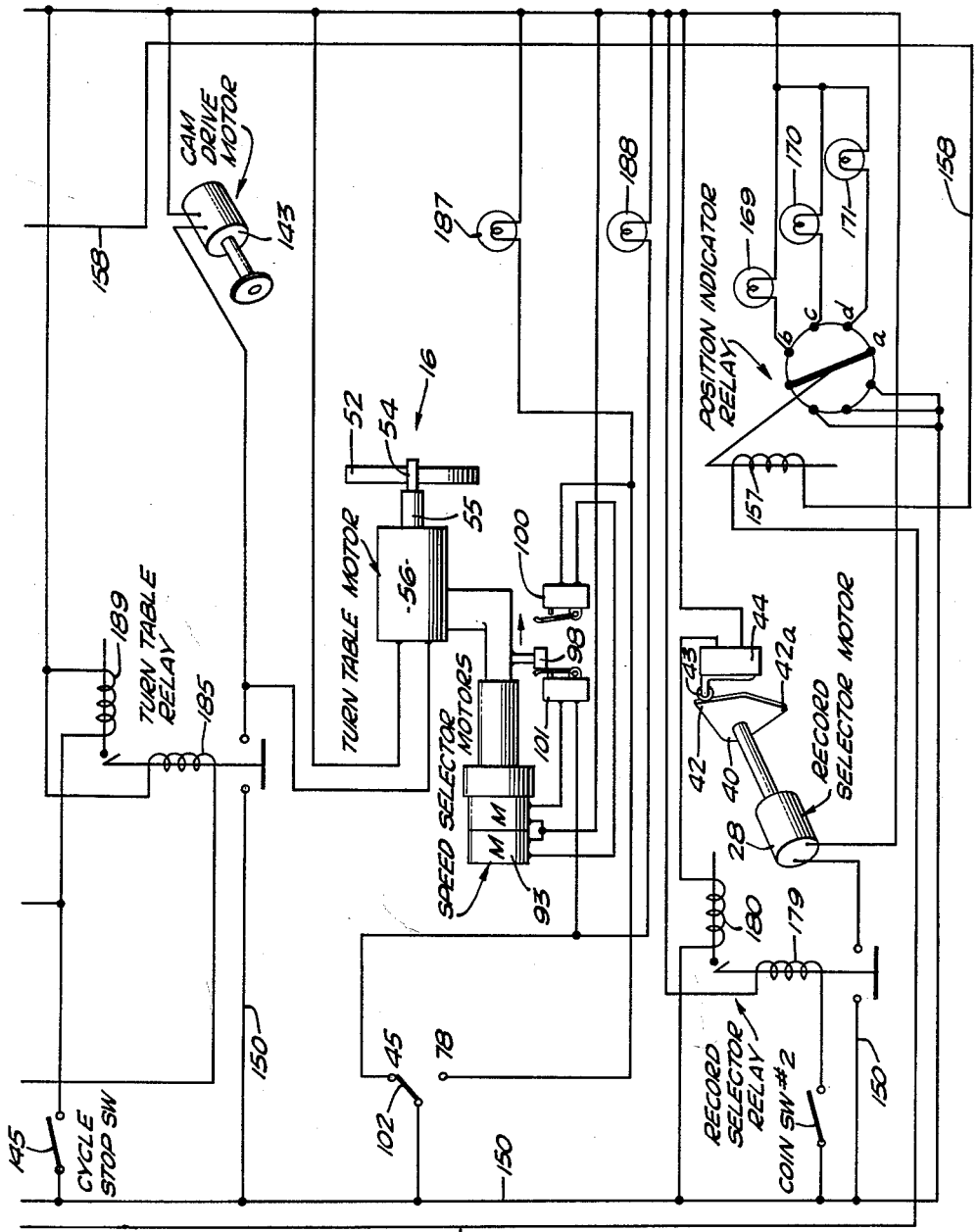

3,169,624
AUTOMATIC COIN-CONTROLLED SOUND RECORDING APPARATUS
John A. Baker, North Hollywood, Lester A. Olson, Los Angeles, and Conrad M. Fritz, West Los Angeles, Calif., assignors to Auto-Photo Company, Los Angeles, Calif., a corporation of California
Filed June 20, 1960, Ser. No. 37,130
24 Claims. (Cl. 194—15)

This invention relates to sound recording apparatus and more particularly to fully automatic coin-controlled apparatus to the type particularly suitable for but not limited to use as an amusement device, the apparatus being operable to make a permanent recording on a blank disc record and to dispense the finished recording to the purchaser at the conclusion of the recording operation.

Though highly versatile and adapted for use in making recordings for various purposes, both professional and non-professional, the present invention was designed more particularly for use as an amusement device and capable of making high quality permanent recordings by the novice and individual patron desiring a recording without need for previous experience or the following of any except the simplest of instructions. The present invention will therefore be understood as providing fully automatic equipment responsive to the insertion of coins within a slot to initiate, carry out and terminate the complete operating cycle, including the dispensing of the completed recording, in a total elapsed period of 3 or 4 minutes after the deposit of the coins. Once the coins have been inserted, the patron need but speak into a microphone when an appropriate signal is given and to cease speaking a prescribed period after a following warning signal.

Preferably, and if the patron so desires, a trial recording may be made and played back to provide information as to the clarity and quality of the recording and amount of material which can be recorded within the allotted time period. Having satisfied himself as to these matters, the patron has the option of recording the trial soundtrack or of making a new one. At the conclusion of the operating cycle, the parts are automatically restored to their initial starting positions in readiness for use by the next patron. The apparatus includes an automatic record feeding magazine having a blank record storage capacity sufficient to supply the normal needs of the apparatus for at least 24 hours. Servicing of the apparatus normally involves merely refilling the record magazine and emptying the coins from the reservoirs therefor. When these two simple operations are attended to the apparatus recycles automatically and repeatedly for many days without need for other attention.

Basically the apparatus includes a first recorder adapted to make a temporary record of sound on a loop of recirculating tape. During the first circulation of this loop a trial recording is made at the conclusion of which the apparatus automatically recirculates the tape while playing it back through a loudspeaker for the edification of the person or persons desiring the recording. If the purchaser so wishes he may recycle the apparatus repeatedly to make sucessive trial recordings, it merely being necessary to insert a new coin for each new recording and playback cycle. If at any time the patron desires a permanent recording, he inserts a coin in a separate coin box receptacle and has his choice of making a recording of the last temporary recording or of a new one, the apparatus operating to transfer the recording from the tape of the first recorder onto a disc record supported on a second and permanent recorder mechanism. As the recording is completed, the apparatus automatically reconditions itself by dispensing the completed recording and restoring all parts to their initial condition in readiness to make new trial recordings.

Among the many interesting and characteristic features of the present apparatus is an arrangement whereby the blank records are stored in horizontal rows at a higher elevation than a record-supporting turntable arranged to rotate about a generally horizontal axis. The adjacent edges of the records in the magazine preferably overlap and are interleaved to minimize sticking of the records and to facilitate their accurate and reliable dispensing to the recording station.

The dispensing mechanism assures the dispensing of a single record at a time, the record being transferred by gravity as it is guided into axial alignment with the turntable. Movement of the record toward the turntable is utilized to activate control devices to effect clamping of the record to the turntable, the shifting of the recording head against the clamped record blank preliminary to cutting a soundtrack in the record by transfer from the tape of the first recorder. At the conclusion of the recording operation the apparatus dispenses the completed record by gravity as the components are repositioned for a new cycle.

If the user wishes to play the record on a 45 speed phonograph, he merely checks to make certain than an indicator button is set opposite appropriate indicia on the front of the machine; if he wishes a 78 r.p.m. recording, he shifts the indicator to a different position on the control panel. This is the sole adjustment required of the patron in addition to the insertion of coins in the two coin boxes.

Accordingly, it is a primary object of the present invention to provide new, improved, highly reliable, versatile automatic recording apparatus adapted to be operated by the novice without previous instruction or experience and capable of making a permanent record of a soundtrack desired by the patron automatically and in a brief interval after appropriate coins are inserted in a coin receptacle.

Another object of the invention is the provision of automatic sound recording apparatus making use of a temporary soundtrack recorder in combination with means for making a permanent recording of the first soundtrack on a permanent recording disc.

Another object of the invention is the provision of patron-controlled automatic recording apparatus in which the insertion of a first coin activates a first recorder to record a soundtrack and immediately thereafter to reproduce the recorded track to provide the patron with an accurate concept of the quality and other characteristics of the recording.

Another object of the invention is the provision of an automatic coin-controlled permanent recording mechanism which recycles to feed a blank record from a magazine onto a turntable for the recording on the record of the soundtrack and including means for dispensing the completed record and restoring all components to their initial condition in readiness for a repeat operating cycle.

Another object of the invention is the provision of a permanent recording mechanism having a blank record magazine and a turntable positioned therebelow with its axis generally horizontal and parallel to the axis of the records stored thereon.

Another object of the invention is the provision of automatic recording apparatus having a blank record magazine wherein the records are arranged in two parallel rows with their adjacent edges slightly overlapping and interleaving, together with power driven automatic means for dispensing individual records laterally and alternately from the separate rows for gravity transfer into recording position on the recorder turntable.

Another object of the invention is the provision of automatic recorder apparatus having a power driven turntable supported for rotation about a horizontal axis and including a pressure pad for holding a record undergoing cutting pressed against the turntable and featuring control devices arranged to be actuated by cam means supported coaxially of the turntable axis.

Another object of the invention is the provision of automatic sound recording apparatus making use of a first recorder having a recirculating loop recording medium and a second recorder for transferring a sound-track from this loop to a recording disc automatically and as an incident to the insertion of a coin in a coin-controlled switch box.

These and other more specific objects will appear upon reading the following specification and claims and upon reconsidering in connection therewith the attached drawings to which they relate.

Referring now to the drawings in which a preferred embodiment of the invention is illustrated:

FIGURE 3 is a transverse sectional view on an enlarged scale taken along line 3—3 on FIGURE 2 and showing in particular details of the two-speed control for the turntable;

FIGURE 4 is a fragmentary sectional view of the positioning means for the recording head;

FIGURE 5 is a vertical sectional view taken along line 5—5 on FIGURE 1 and showing details of the record magazine and dispenser together with details of the turntable and associated accessories;

FIGURES 8a and 8b, taken together, is a schematic wiring diagram of the control circuits interconnecting the temporary and permanent recorder mechanisms.

Figure 1:
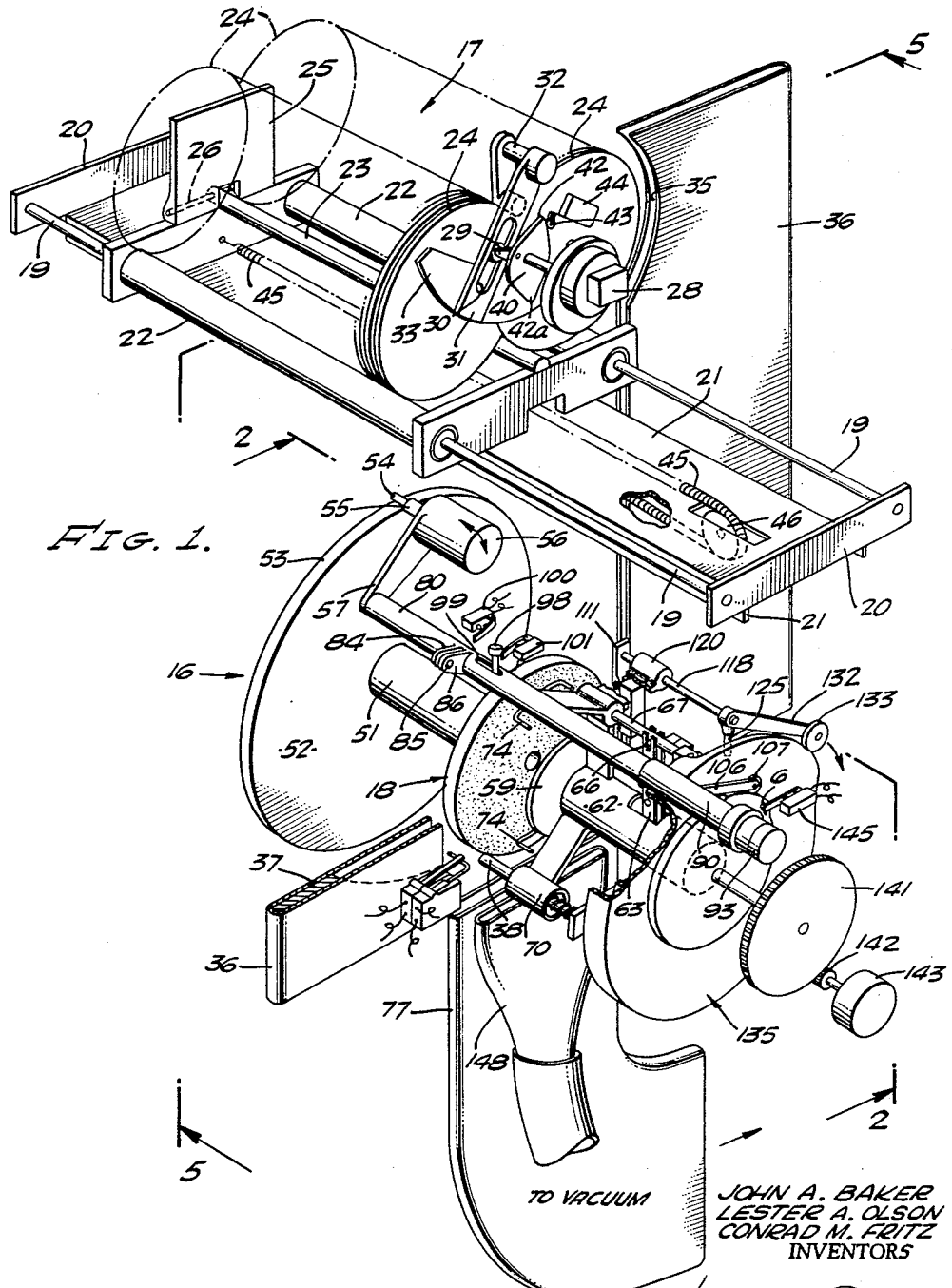
FIGURE 1 is a fragmentary perspective view with parts broken away and showing details of the record magazine and the permanent record recorder mechanisms.

Referring now to FIGURE 8a, there is shown the schematic circuit for the first or temporary sound-track recorder, designated generally 10, of conventional construction. For example, recorder 10 may comprise any well known magnetic tape recorder arranged to recirculate a continuous loop of magnetic tape 11 past a suitably disposed combination recording and pickup head (not shown) and a conventional erasing head (not shown). The magnetic tape recorder schematically illustrated in FIGURE 8a was purchased on the open market and is known under the tradename of Pentron A-4 Tape Recorder. However, it will be understood that any suitable soundtrack recorder of the erasable type may be employed in combination with a loop 11 of recording medium mounted on any suitable supporting drums 12 driven by an electric motor housed within the recorder casing.

Among the usual features of the tape recorder is a microphone 13 and a reproducing loudspeaker 14, the microphone being employed to convey sound to a recording head positioned as customary immediately adjacent the surface of tape loop 11, and the loudspeaker being effective when activated to reproduce a soundtrack previously recorded on tape 11 from the microphone. The control relays provided for tape recorder 10 and shown in FIGURE 8a will be described later in connection with the description of the entire control circuit for the herein-disclosed recording apparatus.

Referring now to FIGURES 1 through 7, and initially more particularly to FIGURE 1, the second or permanent soundtrack recorder, designated generally 16, will be described. Recorder 16 will be understood to include a blank record magazine assembly 17 supported horizontally above the recording turntable 18.

As is clearly shown in FIGURES 1 and 5, magazine 17 comprises a main frame featuring a pair of parallel guide rails 19, 19 rigidly interconnected at their ends by strips 20 secured to the opposite ends of an inverted channel-shaped member 21. Slidably supported coaxially of guide rails 19, 19 are a pair of tubes forming carriage 22. The two tubes of carriage 22 cooperate with a center divider rod 23 in supporting two rods 24, 24 of blank records supported from their lower rim edges with the alternate records of each row overlapping and interleaved in the manner best shown in FIGURES 1 and 5. Removably attached in an upright position at the rear end of the two rows of records is a bracket or backstop 25 held detachably assembled at the rear end of carriage 22 by a keeper pin 26 (FIGURE 1).

Suitably supported opposite the forward end of the rows of records 24 is a power driven record dispenser including a driving motor 28 having a crank arm 29 secured to the outer end of its shaft. A roller mounted on the end of arm 29 operates within an elongated slot 30 formed in the face of a record dispensing arm 31 oscillatable about the horizontal axis of a supporting shaft 32 pivotally supported in stationary bearings, not shown. Fixed to the lower end of arm 31 is a sector-shaped guard 33 having fixed to the center of its rear side of a triangularly-shaped record dispenser member 34 (FIGURE 5) having a thickness generally corresponding to the thickness of an individual blank record 24. The surface of guard 33 on the side facing records 24 is free of obstructions except for dispenser 34.

It will be understood that crank arm 29 has two dwell positions, one being at approximately ten o'clock and the other at approximately two o'clock. When in the ten o'clock dwell position illustrated in FIGURE 5, pusher 34 is located beyond the left hand rim of the right hand row of records 24. In the second or two o'clock dwell poistion, the opposite edge of pusher 34 will lie to the right of the left hand row of records 24 in position to shift the endmost record 24 laterally from carriage 22 and into the opening 35 of the left hand record guide channel or chute 36. Disposed in a similar manner to the right of the right hand row of records is an identical guide channel 36 also having an inlet opening 35. The lower ends of chutes 36 are provided with arcuate guide strips 37 which direct the records inwardly crosswise of the face of turntable 18 where they are supported with their centers in registry with the center of the turntable by retractable support pins 38 supported and actuated in a manner to be discussed presently.

A switch operating cam 40 for controlling the operation of motor 28 and having the shape best shown in FIGURE 5 is mounted on the shaft of dispenser motor 28 and secured in a desired adjusted position relative to crank 29 by a set screw 41. Cam 40 has two identical high points 42, 42a so disposed relative to follower roller 43 of a stationary micro switch 44 as to close switch 44 momentarily as crank 29 approaches the above mentioned two dwell poistions thereof. As will be explained later, momentary closing of switch 44 energizes a holding coil for a record selector relay controlling the operation of motor 28 and in a manner to stop the motor with dispenser 34 in readiness to perform the next record-dispensing operation.

Record carriage 22 is advanced toward the record dispensing station automatically, as by a long coil spring 45 (FIGURE 1) one end of which is connected to the rear end of carriage 22 and the intermediate portion of which embraces a pulley 46 supported by channel member 21. The opposite end of spring 45 is anchored to the rear end of channel member 21. Accordingly, it will be recognized that the tension in spring 45 constantly urges carriage 22 toward the forward end of rails 19, 19 with the forward ends of the blank records 24 pressed lightly against the sector-shaped guard 33 of the record dispensing mechanism.

Figure 2:
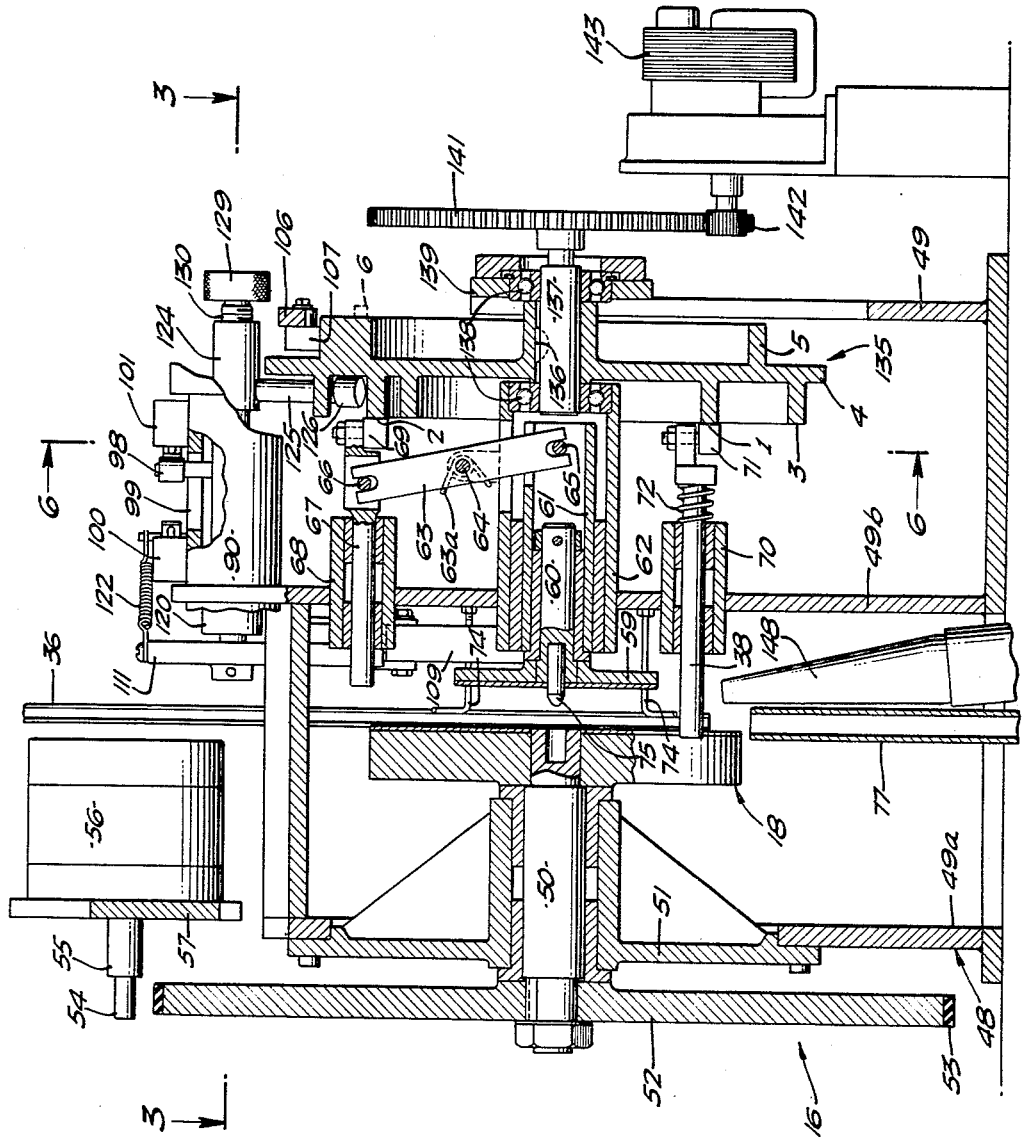
FIGURE 2 is a cross-sectional view on an enlarged scale taken along broken line 2—2 on FIGURE 1 and showing parts of the permanent recorder in readiness to start a recording cycle.

Referring more particularly to FIGURES 1, 2 and 3, turntable 18 and the associated auxiliaries of the recorder will be seen to be mounted in a suitable main housing 48 (FIGURE 2) having three upright transverse partitions 49a, 49b and 49c. Turntable 18 comprises a rather massive disc secured to one end of a shaft 50 snugly journaled against end play in a bearing support 51 secured within an opening of partition 49a. A main drive disc 52 for turntable 18 is secured to the outer end of shaft 50 and has bonded to its rim a ring of resilient high friction material 53.

Disc 52 is arranged to be driven selectively at either 45 r.p.m. or 78 r.p.m. by turntable motor 56 movably supported on the outer end of an arm 57 (FIGURE 1) in a manner which will be described more fully presently. The shaft of motor 56 is stepped to provide a slow speed driving pulley 54 and a high speed driving pulley 55, these pulleys being selectively engageable with the rubber-covered rim 53 of disc 52 to drive turntable 18 at the desired speed.

Record clamping device

Referring now to the right hand half of FIGURE 2 there will be described the record clamping pad 59. The axially shiftable record clamping pad 59 is fixed to a stub shaft 60 journaled in a sleeve 61 slidably supported axially of a tubular bearing housing 62, the latter being welded or otherwise rigidly supported in an opening through partition 49b. Clamping pad 59 and its supporting sleeve 61 is shiftable axially of housing 62 by means of a lever 63 pivotally supported by a pivot pin 64 mounted in a bracket projecting outwardly from bearing housing 62. The lower bifurcated end of lever 63 embraces a pin 65 extending transversely of sleeve 61. Likewise the upper bifurcated end of lever 63 embraces a pin 66 extending crosswise of an opening through a pin 67 reciprocal within a bearing support sleeve 68 mounted in an opening through partition 49b. Secured to the forward end of pin 67 is a cam follower roller 69 riding on an actuating cam surface to be described in greater detail presently. A torsion spring 63a encircles pivot pin 64 with its movable end bearing against lever 63 to urge the latter clockwise as viewed in FIGURE 2 thereby to hold cam roller 69 always in contact with the associated cam surface.

Also mounted in housing partition 49b immediately below and to either side of tubular housing 62 are a pair of tubular housings 70 each reciprocally supporting a stop pin 38 employed to support a new blank record while being clamped against the face of turntable 18. Normally pins 38 have their free ends projecting to the left slightly beyond the resilient padded surface of the turntable thereby providing assurance that the record delivered from either guide chute 36 will be received and supported in alignment with the turntable until clamping disc 59 closes. Rotatably mounted in the right hand ends of pins 38 are cam follower rollers 71 and these together with pins 38 are urged to the right by light compression springs 72 surrounding the pins and bearing against the end of bearing housing 70.

Referring to the area of FIGURE 2 between clamping disc 59 and turntable 18, it will be observed that there are a pair of record stripping devices 74, 74 formed from stiff wire and being generally U-shaped in configuration. The legs of each stripper member 74 are threaded and adjustably supported in a generally horizontal position from partition 49b. The bight portion of each stripping member lies in a vertical plane spaced from the surface of the turntable 18 sufficiently to freely pass a record 24 as it rolls into recording position opposite the turntable from guide channels 36. As clamping disc 59 is retracted away from the turntable, the record is likely to remain on pad 59 because the cone-shaped pilot pin 75 projects through the center hole in the disc. However, this undesired result is avoided by stripper members 74 which engage the rear side of the record and strip it from pilot pin 75 as the clamping disc is retracted from the turntable at the end of a recording operation. The record is free to drop vertically into record delivery guide chute 77 as soon as holding pins 38 are retracted to the right as viewed in FIGURE 2.

Two-speed control device for the turntable

The means for rotating drive disc 52 of turntable 18 selectively either slow or standard speed will now be described with particular reference to FIGURES 1 and 3.

It will be recalled that turntable drive motor 56 is rigidly secured to the outer end of a radial arm 57 secured rigidly to a sleeve 80 (FIGURE 3). Sleeve 80 is journaled about a bearing 81 secured to the left hand end of a tube 82 as by a split ring keeper 83. Projecting radially from sleeve 80 is an arm 84 keyed by pin 85 to an arm 86 mounted on and keyed to tube 82 by a transverse pin 87. It will be appreciated that rotation of tube 82 about its own longitudinal axis will cause motor supporting sleeve 80 to rotate by a like amount about this same axis thereby bodily shifting turntable motor 56 in a vertical plane toward and away from the rim of the turntable driving disc 52.

Provision for rocking and axially shifting shaft 82 includes a pair of sleeve bearings 89, 89 suitably supported at the opposite ends of a rigid tubular bearing housing 90 projecting through and rigidly secured to housing partition 49b; the axis of tube 82 being parallel to the axis of turntable shaft 50. The right hand end of bearing housing 90 as viewed in FIGURE 3 is enlarged and provided with a radial flange or collar 91 to which a reversible electric motor 93 is secured by cap screws 92. Shaft 94 of motor 93 is keyed to a long threaded bushing 95 mating with the threads of a threaded sleeve 96 fixed to the right hand end of tube 82. Rotation of motor 93 in one direction rotates bushing 95 to shift tube 82 axially to the left as viewed in FIGURE 3 to shift the larger diameter pulley 55 of motor 56 axially to the left to overlie the rim of turntable drive disc 52. Thereafter, reverse rotation of motor 93 rotates bushing 95 in the opposite direction to shift tube 82 to the right thereby to return the small diameter driving pulley 54 into driving position opposite the rim of disc 52.

Control of the reversible motor 93 is accomplished as is best shown in FIGURE 1 by a finger 98 fixed to tube 82 and projecting radially through an elongated slot 99 in bearing housing 90. Micro switches 100 and 101 rigidly supported to either side of finger 98 have contact operators positioned to be contacted by finger 98 as the finger reaches the end of its desired path of travel. Thus, as pulley 55 is shifted into driving position finger 98 contacts the operator for switch 100 and opens the switch to de-energize motor 93. Likewise, when motor 93 is reversed to retract motor 56 to bring the small diameter pulley 54 into driving position, finger 98 will contact the operator for switch 101 to again stop the motor. As best appears from FIGURE 8b, switches 100 and 101 are in series parallel with the speed selector control switch 102 accessible to the patron and having two possible positions. When closed to its upper position labeled "45", switch 102 is operative to control the operation of motor 93 to shift the slow speed pulley 54 into driving position whereupon finger 98 opens switch 101 to stop motor 93. If switch 102 is closed to the position marked "78", motor 93 rotates to shift pulley 55 into driving position whereupon finger 98 opens switch 100 to stop the motor.

It is pointed out and emphasized that during the shifting of turntable motor 56 between its two driving positions, motor 56 and its supporting arm 57 are rotated counterclockwise about the supporting tube 82 so that both pulleys 54 and 55 are appreciably out of driving contact with disc 52. The means for assuring this objective is illustrated in FIGURE 3 and comprises a sleeve 104 surrounding the right hand end of tube 82 and keyed thereto by a key 105. Projecting radially to the exterior of sleeve 104 is a rigid arm 106 welded or otherwise secured to sleeve 104. Rotatably supported on the outer end of arm 106 is a cam follower roller 107 positioned to ride upon a cooperating cam surface of the master cam disc to be described presently. Suffice it to say at this point that the cam cooperating with roller 107 is contoured to rotate arm 106 and tube 82 in a direction to lift motor 56 and pulleys 54, 55 entirely clear of the rim of drive disc 52 when recorder 16 is de-energized. Immediately following energization of recorder 16, however, the cam surface rotates out of supporting relation with follower roller 107 allowing the weight of the motor to shift the motor downwardly until one of the pulleys 54, 55 rests against the rubber-tired rim of drive disc 52. Again immediately prior to the de-activation of the recorder following the making of a record, the cam cooperating with roller 107 elevates the roller and arm 106 to rotate shaft 82 and motor 56 to the retracted non-driving position shown in FIGURE 2.

Recording head and control

The recording head support and control will now be described by reference to FIGURES 3, 4, 5 and 6. Recording head housing 109 is suspended from a hinge leaf 110 (FIGURE 4) pivoted to the lower end of a bracket 111 by pin 112. Acting to stabilize and spring-bias head 109 is an arm 113 projecting upwardly therefrom having a hole in its upper end fitting loosely about a threaded stud 114 adjustably supported in bracket 111. Surrounding stud 114 and bearing against the opposite sides of arm 113 are light coil springs 115 effective to hold the recording head resiliently supported about hinge pin 112 while permitting limited pivoting about this hinge to the end that stylus 116 will bear against the record disc 24 under an appropriate soundtrack cutting pressure. As shown in FIGURE 4, recording head 109 and cutting stylus 116 are retracted forwardly away from the turntable.

Bracket 111 supporting the recording head 109 is secured to the left hand end of a shaft 118 slidable axially within bearings 119, 119 at the opposite ends of a journal housing 120 rigidly supported by partition 49b. A pin 121 upstanding from housing 120 supports one end of a tension spring 122, the other end of the spring being secured to bracket 111. Accordingly, it will be recognized that spring 122 is effective to urge shaft 118 together with the recording head 109 mounted thereon to the retracted position of the head shown in FIGURE 4.

Adjustably fixed to the right hand end of recorder head shaft 118 is a sleeve 124 having projecting from its side a rigid arm 125 carrying at its outer end a cam follower roller 126. A key 127 seats in mating slots of shaft 118 and the interior of sleeve 124 thereby permitting the sleeve to shift axially of shaft 118 without permitting arm 125 to rotate relative to this shaft.

An adjustment knob 129 has a hollow stem threaded interiorly and exteriorly, the interior threads mating with threads on the reduced outer end of shaft 118 and exterior threads 130 mating with internal threads of sleeve 124. It will therefore be apparent that rotation of knob 129 shifts sleeve 124 axially of shaft 118 to vary the adjustment between the master actuating cam and the recording head at the far end of shaft 118 relative to the face of turntable 18. By suitable adjustment in the manner described, taken with the adjustment of springs 115 on stud 114, the position of the recording stylus and the pressure thereof on the record can be accurately and precisely controlled.

Figure 6:
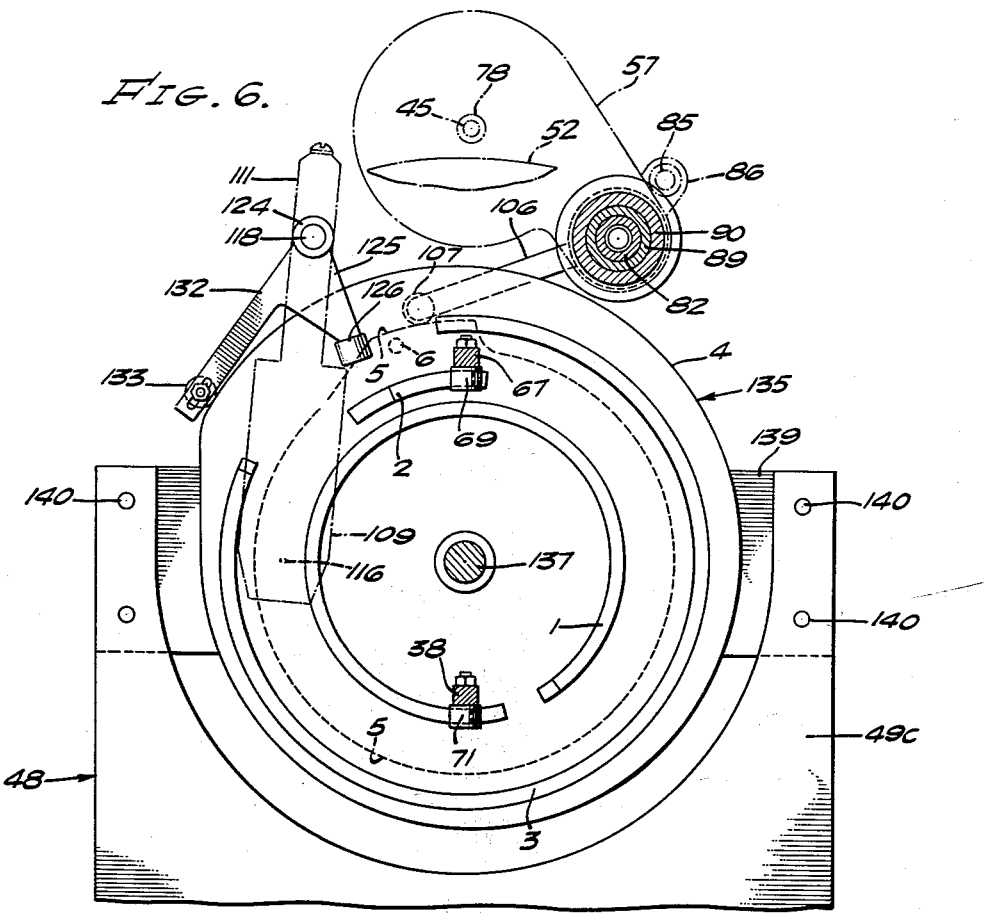
FIGURE 6 is a fragmentary vertical sectional view taken along line 6—6 on FIGURE 2 showing details of the master cam disc employed to control the timed operation of different components of the recorder.

A second arm 132 projecting radially from sleeve 124 is located in the same vertical plane as the above-described arm 125. Adjustably supported in the outer end of arm 132 is a wide-surfaced cam follower roller 133 (FIGURES 3 and 6). The axis of roller 133 is parallel to the axis of the turntable; whereas the axis of cam follower roller 126 on arm 125 extends along the axis of arm 125 and perpendicular to the axis of sleeve 124.

Master control cam assembly

The master cam control assembly will now be described, particular reference being had to FIGURES 1, 2, 3, 6 and 7. As best appears from FIGURES 2 and 6, master cam proper 135 is keyed by a key 136 to a drive shaft 137 journaled in a pair of ball bearings 138, 138. The inner one of these bearings is seated within a receiving recess at the adjacent end of bearing housing 162 and the other bearing 138 is carried centrally of a rigid cross strip 139 secured at its opposite ends by cap screws 140 to the upper arcuate ends of housing partition 49c (FIGURE 6). Keyed to the outer end of shaft 137 is a gear 141 meshing with drive pinion 142 of cam drive motor 143.

Figure 7:
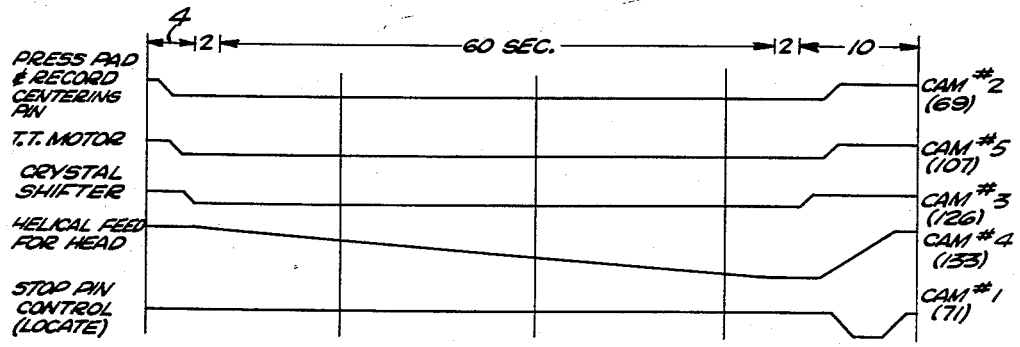
FIGURE 7 is a developed schematic showing of the cam surfaces on the master cam disc and their relative relationships to one another.

As here shown, master cam disc 135 is formed in one integral member and is provided with six separate and distinct camming surfaces each associated with a separate cam follower and each shaped to actuate these respective followers in precise timed relationship graphically depicted in the developed view of the cam surfaces (except cam 6 shown in FIGURE 7. Referring first to the innermost cam ring on the left hand face of the disc as viewed in FIGURE 2, there is shown an axially projecting cam ring 1 projecting axially from the disc and the radial edge of which supports the single cam follower roller 71 effective to operate simultaneously the interconnected ends of the two record locating and stop pins 38. As is clear from FIGURE 7, the surface of cam 1 is of uniform height throughout its circumference except for a short gap very close to the terminal end of the operating cycle, the gap allowing follower roller 71 to move to the right away from the rim of turntable 18 thereby permitting the completed record to drop into the delivery chute 77.

Cam surface 2 has a relatively short high point positioned in the eleven-thirty o'clock position as viewed in FIGURE 6. The associated cam follower roller 69 employed to operate the record clamping pad 59 is so contoured as to hold clamping pad 59 retracted for the requisite period required to effect the unclamping and discharge of a completed record and the movement of a new record into position for clamping to the turntable after being dispensed from the magazine. Spring 63a acts to rotate lever 63 clockwise as viewed in FIGURE 2 and applies the requisite clamping pressure to pad 59 when not prevented from doing so by the high portion of cam surface 2.

Cam 3 is concentric with cam 1 and is effective to engage cam roller 126 to shift shaft 118 axially to move recording head 109 into recording position. The length of the raised surface of cam 3 is such as to hold the recording head in contact with the record throughout the recording period and includes inclined surfaces at its ends to advance and retract the head.

Cam surface 4 is formed along the perimeter of master cam 135. In general, surface 4 is of spiral shape and so designed as to feed the cutting stylus 116 spirally toward the center of the record as recording proceeds. A section of the cam interconnecting the opposite ends of the spiral portion proper is effective to return the recording head to its outer or starting position in readiness for a new recording cycle just prior to the time a switch is opened to de-activate the entire recording cycle.

Cam 5 is the only surface formed on the right hand face of master cam 135, as viewed in FIGURE 2. In this case the outer peripheral surface provides the control surface supporting cam roller 107 carried by arm 106 and is effective to move the turntable driving motor 56 into and out of driving relation with respect to turntable driving disc 52. As appears best from FIGURES 6 and 7, cam surface 5 is of uniform height throughout the major portion of its surface but includes a raised portion properly positioned to elevate turntable motor 56 out of driving relation to disc 52 just before the recording cycle is de-activated and for lowering the motor back into contact with disc 52 shortly after a new recording cycle is initiated, sufficient time being allowed before the latter operation for a new blank record to be dispensed from the magazine and to be clamped to the turntable.

A sixth cam (FIGURE 1) comprises a very short projection 6 extending axially from the outer face of cam 5 (FIGURES 1, 2, 6), this projection being positioned to contact the actuator of a master cutoff switch 145 (FIGURES 1, 8b) suitably rigidly supported on the main housing for recorder 16. Switch 145 is connected in circuit with relays as will be described below to de-activate cam driving motor 143 and turntable motor 56.

There remains to be mentioned means for carrying away the cuttings from the recording stylus 116. As here shown, this means comprises a suction air nozzle (FIGURES 1, 2) having a wide narrow mouth directly below the forward face of the turntable and effective to circulate a high velocity stream of air past the surface of the record to entrain cuttings from the stylus. A suction fan motor, not shown, will be understood as connected in parallel circuit with the cam motor 143 and turntable motor 56 for maintaining a suction air stream flow through nozzle 148, the suction fan motor being arranged to be energized and de-energized simultaneously with the drive for the master cam and the turntable.

CONTROL CIRCUIT

Referring now to the control circuit for the entire apparatus including tape recorder 10 and permanent record recorder 16, it will be understood this complete circuit is illustrated in FIGURES 8a and 8b taken together. The main 120 volt power supply enters at the top of FIGURE 8a and its two continually hot busses 150', 150' will be understood as extending vertically along either side of FIGURES 8a, 8b, bus 150 extending down the left side and bus 150' extending down the right hand side of these figures. For convenience, all lead wires permanently connected with these two hot busses are designated by the same reference characters throughout the schematic. Main busses 150, 150' are protected by the usual safety fuses 151 and include a normally closed master switch 152.

A second and low voltage power circuit is provided by a power transformer T having its power primary coil connected across high voltage busses 150, 150' and its secondary coil wound to provide a 6 volt power output feeding low voltage hot busses 155, 155'. Low voltage bus 155 extends down the left side of FIGURE 8a, whereas low voltage bus 155' extends down the right hand side of this same figure. As explained above in connection with high voltage busses 150, 150', all normally hot leads connected to the low voltage busses are designated by the same reference characters.

As illustrated in FIGURES 8a and 8b, all components are in their proper positions in readiness to start an operating cycle of either recorder 10 or recorder 16 depending on whether the patron inserts a coin to operate coin switch 1 to operate recorder 10, or a coin in coin switch 2 to operate recorder 16. The description which now follows will refer to the principal components of the control circuit in the general order in which the parts are activated or function.

So long as master power switch 152 is closed, as it normally is, power is being supplied to tape recorded 10 and to the amplifier and control circuits therewithin with the result that the appartus is in instant readiness to operate. To initiate operation of tape recorder 10, the patron deposits the necessary coin in a conventional coin switch mechanism. The passage of the coin through the receptacle automatically closes coin switch 1 momentarily thereby activating and latching power relay coil 156 closed in its upper position. The upward closing of the power relay accomplishes two things: First, high voltage is connected through the two upper pairs of contactors of the power relay to leads 153, 154 to complete a power circuit to the tape transport motor within the tape recorder employed to circulate the continuous loop of magnetic tape 11; and secondly, a low voltage power circuit is completed through the lower set of power relay contactors to set up a power circuit through lead 158 to the position indicator relay coil 157 (lower right hand corner, FIGURE 8b).

Positioned directly adjacent the surface of magnetic tape 11 are a pair of normally open switches 164 and 165, both having a connection to the low voltage hot bus 155. These two switches are positioned to be closed momentarily by separate groups of actuators or projections carried in laterally offset relations to one another so as to be effective on only a particular one of the two switches. As here shown, these switch actuating projections are represented as carried by the tape and are operable to engage and close a particular switch blade as they pass beneath the switch. Switch 164 has but a single closing actuator 166, whereas switch 165 has four closing actuators 167a, 167b, 167c, 167d, each operable to close switch 165 as the tape advances through each complete cycle.

Upon each cycle of tape 11, actuator 166 for switch 164 and actuator 167c for switch 165 have just underridden the end of the respective switch blades and remain in this position until the tape recording motor is again started by energizing power relay coil 156. Accordingly, as the tape transport motor circulates tape loop 11 clockwise, actuator 167b closes switch 165 to supply power from bus 155 to coil 157 of the position indicator relay (lower right hand corner, FIGURE 8b). Momentary energization of indicator relay coil 157 indexes its switch contactor one step to complete a circuit through pilot lamp 169 illuminating instructions advising the patron to start recording his message by speaking into microphone 13. The tape continues to circulate and to record the patron's voice picked up by the microphone.

After the message portion of the tape has been circulating for a specified time period, as 50 seconds, actuator 167c will close switch 165 momentarily to activate the position indicator relay into its next position energizing pilot lamp 170 thereby advising the patron there remains 10 seconds of message recording space on the tape. As the time period expires actuator 167d closes switch 165 stepping the position indicator relay clockwise to energize lamp 171 advising the patron to stop speaking. Actuator 167a then passes past switch 165 closing it a fourth time to de-activate pilot lamp 171 and indexing the position indicator relay to the off position illustrated in FIGure 8b. At the same time actuator 167c underrides switch 165, actuator 166 underrides switch 164 closing the latter momentarily to energize stepping relay coil 173 to index the contactor of the stepping relay and energizing coil 174 to the recorder relay. The indexing of stepping relay coil 173 also simultaneously activates the latch release coil 176 of the power relay allowing the contactors of this relay to drop cutting off the initial power supply for the tape circulating motor and opening all circuits controlled by the power relay. However, simultaneously with the release of the power relay, the multiple contactors of the recorder relay are closed upwardly by the described energizing of its operating coil 174 thereby continuing the power supply to the tape transport motor by way of the two lowermost contactors of the recorder relay.

It is to be understood that in the normal position of the recorder relay shown in FIGURE 8a all circuits are conditioned to record a message from the microphone one tape 11. However, when the recorder relay contactors are closed in their alternate or upper position, the circuits controlled thereby are conditioned to cut out microphone 13 and to activate circuits to play back the recorded message through loudspeaker 14. The "playback" position of the recorder relay is indicated by the upper one of the double headed arrow labeled PLAYBACK, whereas the lower end of this arrow is labeled RECORD and represents the normal or recording position of the recorder relay. It will therefore be clear that recorder relay coil 174 takes the place of the usual manually operable switch button normally present on the tape recorder and shiftable from one position to the other to condition the recorder either for "recording" or for "playback" operation. Accordingly, it is unnecessary to show the interval circuits of the recorder actually controlled by the recorder relay, these being well known to those skilled in the art and forming no part of the novelty here claimed.

Recorder 10 now continues to operate as previously, the recorder head being effective to pick up the message recorded on the tape during the first cycle and to play this message back through loudspeaker 14 in order that the patron may listen to the message delivered to the microphone a few moments previously. Actuators 167a, 167b, 167c and 167d close switch 165 during this second circulation of the tape but without energizing lamps 169, 170 and 171 since the power supply to the position indicator relay is now de-activated because the power relay contactors are open. As tape 11 completes its second complete cycle or circuit, actuator 166 underrides switch 164 closing it momentarily and again pulsing stepping relay coil 173 thereby opening the power supply circuit to recorder relay coil 174. This allows the contactors of the recorder relay to move to their lower or "record" position. Since the power relay is also now de-activated the restoration of the recorder relay contactors to their lower position opens the power supply circuit to the tape recorder motor which stops, leaving tape 11 exactly in its initial position as shown in FIGURE 8a.

Two complete cycles of recorder tape 11 have now taken place and the tape is properly positioned for a third cycle provided the patron wishes to make a permanent recording of the sound track already present or a different message, the operation being as follows:

*Operation of the permanent record recording cycle*

Initiation of the permanent record recording cycle begins with the insertion of the appropriate coin in the receptacle controlling coin switch 2 (lower left hand corner, FIGURE 8b) thereby energizing adjacently positioned coil 179 of the record selector relay thereby latching it closed to complete the power circuit to record selector motor 28 located on the record magazine.

Referring to FIGURE 1 it will be seen that rotation of the record selector or dispensing motor 28 rotates crank 29 on the shaft of this motor to swing arm 31 to the right or left depending on the position in which this arm stopped during the previous swing thereof. As arm 31 swings, record pusher 34 attached thereto engages the edge of the foremost record 24 and dispenses it laterally into one of the guide chutes 36. Motor 28 continues to rotate until dispenser arm 31 reaches its alternate position whereupon one of the high points 42, 42a of control cam 40 (carried by the shaft of motor 28) closes switch 44 momentarily thereby energizing release coil 180 of the record selector relay allowing its contactor to fall and open the power circuit to record selector motor 28. It is pointed out that cam 40 and switch 44 are so related that record pusher 34 comes to rest only after it is behind the edge of the next record in the magazine and in position to dispense that record the next time selector motor 28 is energized.

The record falling through one of the two chutes 36 exits through the lower end of the chute, across the face of the turntable and onto the supporting pair of pins 38, 38 which are shown as occupying four-thirty and seven-thirty o'clock positions, respectively, relative to turntable 18 (FIGURE 5) and with the record in registry with the turntable. As the newly dispensed blank record exits from the lower end of chute 36 onto pins 38 it contacts and depresses an actuating lever 182 of a micro switch 183, there being a similar actuator 182' and micro switch 183' associated with the other delivery chute 36. Switches 183, 183' appear at the left hand margine of FIGURE 8a and are of the single-throw, double-pole type in order to supply current momentarily to a pair of control circuits. The operation of switches 183, 183' is identical, each performing the same functions; hence, it is immaterial whether a record is dispensed from the one or the other side of the record magazine.

Assuming that the record was delivered to the right as viewed in FIGURE 5, it will close switch 183' a moment prior to delivery of the record in registry with turntable 18. Closing of switch 183' by the falling record momentarily activates stepping relay coil 173 indexing the contactors of this relay 90 degrees to complete a circuit to the recorder relay coil 174 closing this relay upwardly to its "playback" position. Simultaneously the other blade of switch 183' energizes coil 184 of the crystal relay lifting the contactors thereof upwardly to close a circuit from the pickup head on the tape recorder and the coil in recorder head 109 to activate recording stylus 116. Accordingly, the recorder head rather than the loudspeaker is now energized and head 109 is effective to cut a soundtrack on the record clamped to turntable 18.

At the same time the recorder head relay is energized, so is a circuit to the latch release coil 176 of the power relay. Actually at this time the power relay is open and its contactors should be in the lower position illustrated in FIGURE 8a. If for any reason the contactors should be latched in their upper position, the momentary energization of coil 176 due to the brief closing of switch 183' by the falling record releases the contactors thereby assuring that the recorder tape circulating motor will stop as soon as it has completed one full circuit and its actuator button 166 has underridden switch 164 associated with magnetic tape 11.

Likewise, simultaneously with the actuation of the recording head relay coil 184, coil 185 of the turntable relay is activated to latch its contactors closed, the power to coil 185 being supplied by way of switch 183'.

From the foregoing it will be clear that the falling blank record has multiple functions all associated with the activation of both tape recorder 10 and permanent record recorder 16. Not only does the tape start to circulate, but the closing of the turntable relay coil 185 completes a power supply circuit to driving motor 143 for master cam 135, as well as to the turntable motor 56. Hence, the tape circulating motor, the cam driving motor, and the turntable driving motor all start simultaneously. The various operations initiated thereby now take place in timed relation as determined by the cammed surfaces 1, 2, 3, 4, 5 and 6 of master cam 135 as it rotates through one complete revolution. The starting positions of these cams are depicted at the left hand end of the respective cam surfaces shown developed in FIGURE 7. It will be noted that the reference character for the cam roller operated by the associated cam surface is shown in brackets along the right hand side of FIGURE 7.

Cam roller 69 is the first one to be activated by the start of the rotation of master cam 135. As cam roller 69 rolls off the high point of cam 2, spring 63a pivots lever 63 (FIGURE 2) clockwise causing the conical head of pilot 75 to enter the central opening in the record to center the record accurately on the pin as pad 59 moves to the left to clamp the record against the soft clamping surface of turntable 18.

As the clamping action is completed, cam surface 5 allows cam roller 107 and its supporting arm 106 to rotate counterclockwise about the axis of shaft 82 (FIG- URE 6) thereby lowering turntable pulley 54 into contact with the turntable driving disc 52.

As the turntable starts to rotate, cam 3 comes into action and its inclined end contacts cam roller 126 on arm 125 of shaft 118 (FIGURE 6) to shift shaft 118 axially carrying recording head 109 and cutting stylus 116 into contact with the rotating record. As the stylus contacts the record, cam roller 133 on arm 132 of shaft 118 moves along cam 4 on the periphery of master cam 135 and cam surface 4 then allows the stylus to move gradually inward toward the center of the record, cutting the soundtrack in a spiral path.

No action occurs on cam surfaces 1 or 6 until substantially the end of the single revolution of cam 135.

From the foregoing it will be clear that recorder 10 operates as described above to transfer the soundtrack present on tape 11 during a period of approximately 60 seconds.

At the end of the recording period the several cam surfaces on disc 135 act on the associated cam followers for each in the sequence represented on the schematic cam diagram in FIGURE 7. The first cam to act at the end of the record period is cam 3 which lifts roller 126 to retract the recording head away from the disc, whereupon cam 4 and cam roller 133 cooperate to swing the head outwardly to its initial position in front of but opposite the rim area of the record.

While these actions are taking place, cams 2 and 5 act on rollers 69 and 107, respectively, to retract clamping pad 59 and to retract the turntable motor 56 from disc 52. At the same time, cam 1 allows spring 72 associated with pins 38 and cam roller 71 to move pins 38 axially away from the turntable thereby allowing the released and completed record to drop into delivery chute 77 leading to a trough or pocket (not shown) accessible to the patron desiring the record. After or as each of the foregoing operations has been or is being completed, the very short cam surface 6 on the forward face of cam 5 (FIGURE 1) underrides the actuator for micro switch 145 momentarily closing this switch (also labeled "cycle stop SW" on FIGURE 8b).

The closing of the cycle stop switch 145 momentarily energizes latch release coil 189 of the turntable relay allowing its contactor to fall and open the power circuit to cam drive motor 143 and to turntable motor 56. Also of importance is the fact that the momentary closing of switch 145 by cam 6 completes an energizing circuit through latch release coil 190 of the recorder head relay (FIGURE 8a). This results in the dropping of the two contactors of the recorder head relay to their lower closed positions shown in FIGURE 8a wherein cutting head 109 is de-activated or disconnected from the recorder pick up head, and loudspeaker 14 is reconditioned for use during the next "playback" operation. Both motors 56 and 146 then coast to a stop through an interval sufficient to allow cam 6 to pass slightly beyond switch 145 allowing this switch to remain open until the next revolution of master cam 135.

As cam 6 is underriding cycle stop switch 145, projection 166 on tape loop 11 is riding past the associated switch 164 of the tape recorder momentarily closing this switch to pulse coil 173 of the stepping relay (FIGURE 8a) and indexing its contractors to their open position thereby cutting off power to coil 174 of the recorder relay. Cutting off the power to this latter relay allows the multiple contactors thereof to move to their lower position labeled "record" to restore the circuits of the tape recorder to their initial condition in readiness for the "trial" recording of a message on tape 11 by the next patron. All circuits are now fully restored to their original condition shown in the combined schematic of FIGURES 8a and 8b.

Should the patron merely wish to make a trial recording and to have it played back, he may do so by inserting a coin only in coin switch No. 1 and proceed to use recorder 10 as described above. At the conclusion of this operation, the circuits are automatically reset to the positions illustrated in FIGURE 8a.

While the particular automatic coin-controlled sound recording apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. Apparatus for making a permanent recording of a soundtrack utilizing cyclically-operating apparatus employing coin-controlled means to initiate an operating cycle, said apparatus comprising a first erasable type recorder equipped with a continuous loop of magnetic tape and a second permanent record recorder operatively connected to record a voice track temporarily recorded on said erasable recorder, microphone means for conducting sound into said first recorder for temporary recording therein, coin-controlled means for initiating an operating cycle of said first and second recorders, and means operable automatically upon completion of the recording of the soundtrack by said second recorder and upon deposit of the proper coins in said coin-controlled means to condition both of said recorders for a new cycle of operation.

2. That improvement in automatic apparatus for making and dispensing a permanent record of a soundtrack and of the type having a first self-recycling erasable soundtrack recorder having a continuous loop of magnetic tape and operative to transfer a temporary soundtrack therefrom to a permanent soundtrack recording media while the latter is supported on a second sound recorder, operator controlled coin operated means for activating said automatic apparatus for operation through a complete recording cycle, said improvement comprising automatic means operable following activation of said apparatus by deposit of the proper coins in said coin-operated means to inform the user of the apparatus when to begin introducing sounds into a microphone feeding the first of said recorders, and means operable during said operating cycle to transfer the sounds so recorded to a permanent soundtrack record on said second recorder and for thereafter automatically restoring both of said recorders to their respective initial starting positions.

3. Recycling apparatus for making and dispensing a permanent record of a soundtrack in response to an act initiating a cycle of operation of said apparatus, said apparatus comprising a unitary assembly including first and second recorder means, said first recorder means having a continuous loop of magnetic tape, sound pick-up means connected to the input of said first recorder for making a temporary and erasable soundtrack thereon, means for transferring the soundtrack from said first recorder to the input of said second recorder to make a permanent soundtrack at said second recorder, means for automatically dispensing the completed permanent soundtrack and for de-activating said first and second recorders following completion of the permanent soundtrack, and coin-actuated switch means for activating said first recorder independently of said second recorder.

4. Recycling sound recording apparatus as defined in claim 3 characterized in that said coin-actuated switch means includes means operable by the insertion of the proper coins in said switch means to initiate a repeat cycling of said first recorder in the first cycle of which a message is recorded by said first recorder and in the next cycle of which the recorded message is audibly reproduced.

5. Coin-controlled automatic recording equipment comprising a unitary self-contained device having a coin controlled tape recorder operable when activated by the insertion of a coin to record a soundtrack on a continuous loop of an erasable recording medium, a magazine of blank records, second recorder means for cutting a permanent soundtrack on a blank record from said magazine, which soundtrack is derived from the soundtrack temporarily recorded on said erasable recording medium, and means for automatically discontinuing the operation of both recorders and restoring the components to their initial positions at the end of a complete recording cycle.

6. Automatic sound recording equipment as defined in claim 5 characterized in the provision of means operable to rotate said blank record selectively at different speeds depending upon whether it is desired to produce a record for use on a standard speed or slow speed reproducer.

7. Automatic sound recording equipment as defined in claim 5, characterized in that said tape recorder includes means responsive to the movement of the recording tape thereof to switch said recorder alternately from recording to playback operation following each actuation of the apparatus by the insertion of a coin.

8. Automatic sound recording equipment comprising a tape recording mechanism, means driven by said mechanism for recirculating a continuous loop of recording medium past a combination recording and pickup head, means for conducting a sound signal through said head to record the signal on said tape, sound reproducer means connectable to said head to reproduce the recorded soundtrack as audible sound corresponding to the input signal, coin mechanism for activating said recorder and control means operable following activation of the recorder to operate said tape through two complete cycles during the first of which said recorder is conditioned to record a soundtrack and during the second of which the soundtrack recorded during the first cycle is reproduced as audible sound, said control means including switch control means operable by the movement of a selected portion of said tape therepast, and means for energizing said switch control means at a voltage appreciably lower than the voltage applied to other portions of said tape recording mechanism.

9. Sound reproducing equipment as defined in claim 8 characterized in that said control means further includes indicator means operable as said tape advances during the first cycle thereof to convey different intelligence to the user during different portions of said cycle.

10. Automatic sound recording apparatus comprising a first recorder having an erasable tape recording medium for storing a first soundtrack thereon temporarily, second recorder means operatively associated with said first recorder for making a permanent soundtrack recording of said first soundtrack on an initially blank disc, magazine means for storing blank records, means for transferring a blank record to said second recorder prior to a soundtrack transferring operation, and means responsive to movement of the record blank from said magazine to condition said first records to be de-activated and restored to the initial position of its components as the tape reaches the end of its permanent record recording cycle.

11. Automatic sound recording apparatus comprising a first recorder having a recirculating erasable tape recording medium, second recorder means operatively associated with said first recorder for making a permanent soundtrack record from a recording temporarily present on said recirculating tape, means for circulating said tape through a first cycle to record a soundtrack thereon and for thereafter recirculating the tape through a second cycle to reproduce the recording thereon, and means for circulating said tape through a third cycle simultaneously with the operation of said second recorder whereby to make a permanent recording on a disc record of a soundtrack present on said tape while traversing the third cycle thereof.

12. Automatic sound recording apparatus as defined in claim 11 characterized by the provision of means for activating said second recorder following the completion of the second cycle of said tape by said first recorder and prior to the circulation of said tape through the third cycle thereof.

13. Automatic sound recording apparatus as defined in claim 11 characterized by the provision of means for de-activating both of said recorders as said tape completes its third cycle of operation and for automatically restoring the components of said recording apparatus in readiness to start a new first and second cycle of said tape by said first recorder without operation of said second recorder.

14. A coin-controlled sound recorder comprising a motor driven turntable, a blank disc magazine, coin-switch controlled means operable to dispense a blank record from said magazine onto said turntable in response to the insertion of a coin, means responsive to the dispensing of a record blank to drive said turntable and to move a recording head across the record blank on the turntable, and means operable as the recording head completes traversal of said record to withdraw said recording head, dispense the completed record from the turntable and de-activate said recorder until the next coin is inserted in said coin-switch means to institute a repeat cycle of operation, said blank disc magazine including means for storing said blanks in two rows overlapping only partially at their adjacent portions, and motor driven record dispensing means including separator means for separating the end record alternately from first one row and then the other.

15. A coin-controlled sound recorder as defined in claim 14 characterized in the provision of selector means operable to drive said turntable optionally at a standard recording speed and at a predetermined slower speed.

16. In combination with a horizontal-axis motor-driven recording apparatus having a turntable for supporting a blank record while having a soundtrack recorded thereon, a blank record magazine for dispensing a blank to said turntable periodically, said magazine including means for supporting two rows of blanks side-by-side with the rim edges thereof interleaved, and means positioned at one end of said rows operable to dispense record blanks alternately from first one and then the other of said rows.

17. A blank record dispensing magazine for recording apparatus comprising a stationary frame movably supporting a record carriage, means for moving said carriage toward a dispensing station, means for supporting a plurality of rows of records on said carriage with their adjacent rims interleaved to prevent the same from having wide area surface contact and tending to stick together in consequence, and power driven means at said dispensing station for feeding a record to the recording apparatus from first one and then another of said rows.

18. A record dispensing magazine as defined in claim 17 characterized in that said power driven means comprises record pusher means engageable with the edge of the foremost blank record to shift the same laterally beyond the magazine, and guide chute means positioned to receive a record from either row of said magazine and to conduct the same into axial alignment with a recording turntable and in readiness to be seated thereon.

19. A record dispensing magazine as defined in claim 17 characterized in that said power driven means comprises a record pusher supported for oscillatory movement across the dispensing end of said rows of blank records and engageable with an edge thereof adjacent the area of interleaving, and cam-operated power-controlled means operable automatically as one record is dispensed to stop said power means with the pusher positioned to engage the endmost record to dispense the same on the next energization of said power-controlled means.

20. A record dispensing magazine as defined in claim 17 characterized in the provision of separate record receiving and guide chute means located one to either lateral side of said magazine opposite said dispensing station, said record guide chute means each terminating in position to support a record in axial alignment with a recording turntable.

21. In combination, sound recording means adapted to be repeatedly activated for a recording operation in response to the insertion of a coin in coin-actuated switch mechanism, said recording means having a main frame rotatably supporting a turntable on a horizontal axis, blank record magazine means including means for dispensing a single blank record at a time for gravity delivery into axial alignment with said turntable, means for clamping a record to said turntable, a recording head movably supported on said frame and having a recording stylus, and automatic means including a plurality of cam and cam follower linkages operable in sequence to dispense a record from the magazine, clamp the same to said turntable, position the recording stylus on the record adjacent its rim as the head is spirally advanced toward the center of the rotating turntable until the recording is complete and thereafter returning the recorder head to its retracted starting position as the record is discharged from the turntable, means for conveying chips and threads of cuttings formed from the record by the stylus as recording proceeds away from said record in a flowing stream of air to prevent said cuttings from fouling the recording and the recording apparatus, means selectively operable to rotate said turntable at different predetermined speeds, and including a single turntable driving motor having pulleys of different diameters individually positionable to drive said turntable, and power controlled means effective to shift either of said pulleys into driving position as respects the turntable.

22. In automatic apparatus for recording a soundtrack in a blank record, a main frame supporting a turntable in a substantially vertical plane, means for feeding a blank record into a temporary support position in general axial alignment with said turntable, record clamping means rotatably supported and normally positioned closely spaced from said turntable, means operable to press said record clamping means and a record against the turntable in accurately centered position thereon, a recording head normally positioned spaced away from said turntable, means operable automatically following the clamping of a blank record in place on said turntable to move said recording head into recording position and for advancing the same toward the record center as the turntable rotates, and means operable as the recording head approaches the center of the record to return the recording head to its retracted starting position and to dispense the recording from said turntable.

23. Automatic sound recording equipment as defined in claim 5 characterized in that said sound recorder means has a horizontal-axis motor-driven turntable for supporting a blank record while having a soundtrack recorded thereon, and in that said magazine of blank records includes means for supporting a plurality of rows of blank records on carriage means movable toward a dispensing station operatively associated with said turntable, said rows of blank records having their adjacent rims interleaved, and means positioned at said dispensing station at one end of said rows of blank records operable to dispense a single blank record alternately from first one and then the other of said rows of blank records.

24. Automatic sound recording equipment as defined in claim 23 characterized in which said blank record dispensing means includes motor driven means having separator means for separating the end record alternately from first one row and then the other.

References Cited by the Examiner

UNITED STATES PATENTS

| | | | |
|---|---|---|---|
| 1,772,990 | 8/30 | Feher | 274—10 |
| 1,896,851 | 2/33 | Raynolds | 274—1 |
| 2,029,730 | 2/36 | Mallina. | |
| 2,096,805 | 10/37 | Hickman | 179—100.2 |
| 2,229,430 | 1/41 | Warner | 274—10 |
| 2,333,235 | 11/43 | Clausen | 179—6 |
| 2,336,777 | 12/43 | Clausen | 179—100.2 |
| 2,660,623 | 11/53 | Somers | 179—100.4 |
| 2,935,325 | 5/60 | Durant. | |
| 3,009,705 | 11/61 | Foekel et al. | |
| 3,038,037 | 6/62 | Kobler | 179—100.4 |

SAMUEL F. COLEMAN, *Acting Primary Examiner.*

NEWTON N. LOVEWELL, BERNARD KONICK, IRVIN L. SRAGOW, *Examiners.*